Patented Aug. 24, 1937

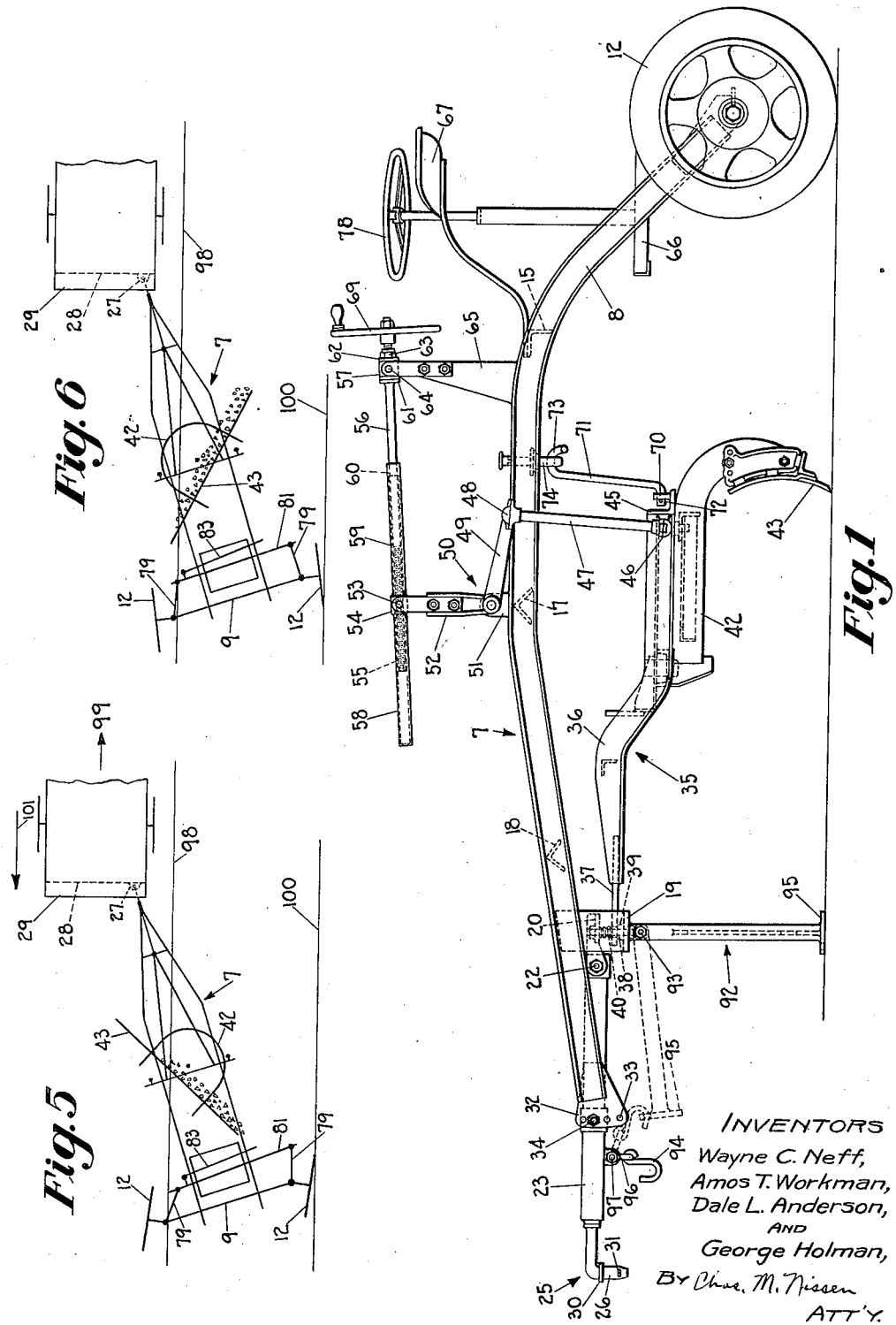

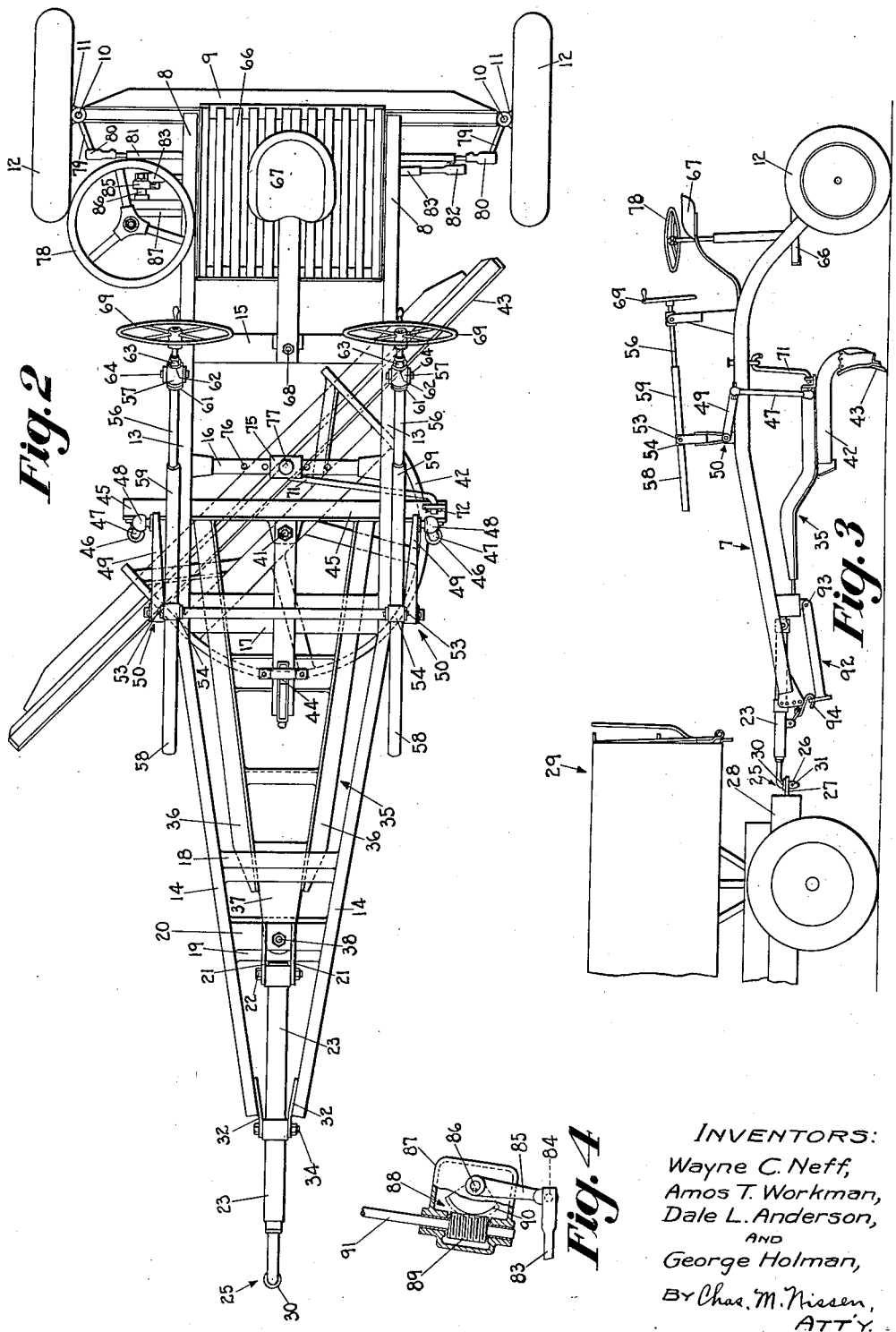

2,090,732

UNITED STATES PATENT OFFICE 2,090,732

ROAD GRADER

Wayne C. Neff, Amos T. Workman, Dale Lupher Anderson, and George Holman, Ravenna, Ohio, assignors to The Galion Iron Works and Manufacturing Company, a corporation of Ohio Application June 7, 1934, Serial No. 729,400

4 Claims. (Cl. 37—164)

Our invention relates to road working machines, particularly of the road grader type, and one of the objects of our invention is the provision of improved and efficient mechanism for finishing or grading the shoulders at the sides of previously built roadways.

Another object of our invention is the provision of a road grader which may be detachably connected to a hauling truck and steered by means of mechanism connected to the rear wheels of the grader.

A further object of the invention is the provision in a trailer grader of mechanism operable from a single operator's station for steering the grader and adjusting the grading mechanism thereof.

Another object of the invention is the provision of ground supporting means for the front end of a trailer grader when not connected to a hauling vehicle.

More particularly, it is the object of our invention to provide in a trailer grader adapted to be detachably connected to the rear end of a hauling truck, steering mechanism at the rear end thereof adapted to cooperate with a moldboard and adjusting mechanism therefor to direct material on to or off from the shoulder of a hard-surfaced roadway on which the hauling vehicle travels while trailing the grader behind the same.

Other objects of the invention will appear hereinafter, the novel features and combinations being set forth in the appended claims.

In the accompanying drawings,

Fig. 1 is an elevational view of a trailer grader embodying our improvements;

Fig. 2 is a plan view of the machine shown in Fig. 1;

Fig. 3 is an elevational view of the combination of a dumping truck with the trailer grader shown in Fig. 1;

Fig. 4 is a rear elevational view, partly in section, of certain details of the steering mechanism connected to the rear wheels of the grader;

Fig. 5 is a diagrammatic view illustrating the operation of the combination shown in Fig. 3 when material is being scraped laterally of a hard-surfaced roadway on to a shoulder at one side thereof; and Fig. 6 is a diagrammatic view similar to Fig. 5 but illustrating the operation of scraping material on the shoulder at the side of a hard-surfaced roadway toward the latter.

Referring to Fig. 1, it will be seen that the supporting frame 7 is upwardly arched intermediate its ends and is downwardly and rearwardly inclined at 8 for attachment to the transverse crosspiece 9 to the ends of which are pivoted at 10, 10 the axle brackets 11, 11 for supporting the rear wheels 12, 12.

By referring to Fig. 2 it will be seen that the supporting frame comprises two spaced-apart side members which are horizontal and parallel at their uppermost portions as indicated at 13, 13 and are downwardly inclined and converging at their forward portions as indicated at 14, 14. The side members are rigidly connected together by the rear cross-piece 9 and by the spaced-apart cross-pieces 15, 16, 17, 18 and 19.

The cross-piece 19 is U-shaped and between the vertical plates thereof is rigidly secured an auxiliary cross-piece 20 spaced above the lower horizontal plate of the cross-piece 19, as shown in Fig. 1. The auxiliary cross-piece 20 is provided with vertical spaced-apart forwardly extending plates 21, 21 between which is pivoted by means of a bolt 22 the rear end of the machine drawbar 23 to the forward end of which is rigidly secured the hook 25, the vertical member 26 of which is adapted to fit into a hole in the plate 27 attached to the rear end of the frame 28 of the dumping truck 29, shown in Fig. 3. A collar 30 on the vertical member 26 of the hook 25 is adapted to rest on top of the plate 27, and a cotter pin 31 at the lower end of the member 26 may be relied on to lock the hook 25 to the frame 28 of the dumping truck while the trailer grader is in operation as illustrated in either Fig. 5 or Fig. 6.

At the forward ends of the converging portions 14, 14 of the supporting frame 7 of the machine are attached spaced-apart plates 32, 32 which are preferably each triangular in shape as shown in Fig. 1 and provided with a series of holes 33 for receiving a bolt 34 to hold the hook 25 at an adjusted elevation relative to the frame 7.

Under the supporting frame 7 is a moldboard drawbar 35 which tapers or converges forwardly as shown in Fig. 2. Secured to the forward ends of the side members 36, 36 of the drawbar 35 is a horizontal plate 37 which tapers or converges forwardly and is provided with an opening through which loosely extends the bolt 38. The plate 37 rests on a boss 39 at the center of the upper surface of the horizontal plate of the U-shaped cross-piece 19. A spring 40 is located between the auxiliary cross piece 20 and the plate 37. This spring surrounds the bolt 38 and urges the plate 37 against the boss 39. The opening in the plate 37 is of sufficient size to permit adjusting movements of the drawbar 35 on the boss 39 on longitudinal and transverse axes.

Pivotally connected at 41 to the rear end of the drawbar 35 is a circle 42 for supporting the scraper blade or moldboard 43 for adjustment relative to the drawbar 35 on the upright axis of the pivot 41. The circle 42 and the scraper blade or moldboard 43 rigidly attached thereto may be locked in adjusted position to the drawbar 35 by means of the latch mechanism 44.

At the rear end of the drawbar 35 is a transverse angle iron 45 to the ends of which are connected by means of the ball and socket joints 46, 46 the lower ends of the vertical hangers 47, 47. The upper ends of the hangers 47, 47 are connected by means of the ball and socket joints 48, 48 to the rearwardly extending arms 49, 49 of the bell cranks 50, 50 which are pivotally mounted on transverse horizontal axes to brackets one of which is shown in elevation at 51 in Fig. 1. The brackets 51 are preferably located on the tops of the forward ends of the horizontal portions 13 of the supporting frame 7 immediately above the ends of the cross piece 17. To the upper ends of the vertical arms 52 are pivoted at 53, 53 the nuts 54, 54 through which are threaded the screw-threaded inner end portions 55 of the rods 56, 56, the rear and outer ends of which are journaled in the bearings 57, 57.

The nuts 54, 54 are provided with tubular extensions 58, 58 forwardly of the pivots 53, 53. The nut 54 is also provided with rearwardly extending tubular portions 59, 59, the rear ends of which are provided with slide bearings 60 for the rods 56, 56. It will thus be seen that the screw-threaded portions 55 with the rods 56, 56 are entirely enclosed by the tubular extensions 55, 55 and 59, 59.

On the rear ends of the rods 56 are collars 61, 61 and 62, 62 held in place by the nuts 63, 63 as shown in Fig. 1 so that the rods 56, 56 may rotate in the bearings 57, 57 but can not be moved longitudinally therein. The bearings 57, 57 are pivotally mounted at 64, 64 to the upper ends of brackets 65 mounted on the rear ends of the horizontal portions 13, 13 of the supporting frame 7 adjacent to the cross-piece 15.

Between the rearwardly extending and downwardly inclined portions 8, 8 of the supporting frame is rigidly secured an operator's platform 66 as shown in Figs. 1 and 2. An operator's seat 67 may also be secured at 68 to the center of the cross-piece 15 in position to enable the operator to reach either or both of the wheels 69, 69 which are connected to the rear ends of the screw rods 56, 56. It will thus be seen that the hangers 47, 47 may be individually lifted or lowered by rotating the wheels 69, 69 each of which actuates screw elements cooperating with nut elements to swing the bell cranks 50, 50 on their horizontal transverse axes. The moldboard or scraper may thus be adjusted in elevation and in inclination relative to the surface on which the machine is supported.

Since the forward end of the drawbar 35 is pivotally connected on a vertical axis to the U-shaped cross-piece 19 and since the hangers are universally connected at their lower ends to the outer ends of the cross bar 45 and universally connected at their upper ends to the bell cranks, the rear end of the drawbar together with the circle and moldboard or scraper may be shifted laterally relatively to the supporting frame 7.

Secured to one end of the cross bar 45 is a vertical plate 70 which is provided with an opening through which the lower end of the retaining rod 71 extends for pivotal connection to the transverse bar 45. The lower end of the retaining rod 71 may be retained by means of the cotter pin 72 in its pivotal connection to the plate 70. The upper end of the rod 71 is hooked at 73 to extend through an eye 74 suspended from the tubular bracket 75 which is slidable along the cylindrical cross-piece 16. The latter is provided with a series of vertical holes 76 into which is adapted to extend a pin 77 in the tubular bracket 75 to hold the latter in adjusted position. Consequently, after the rear end of the drawbar together with the circle and scraper or moldboard carried thereby have been shifted laterally they may be held in adjusted position by means of the retaining rod 71 and the parts connected thereto including the pin 77.

It should be understood that when the trailer grader is detachably hooked to the rear end of a dumping truck, steering of the grader is effected by movement of the rear wheels 12, 12 on the vertical pivots 10, 10 while the towing movement of the truck is along straight lines. For this purpose a steering wheel 78 is mounted near the operator's platform 66 and near the operator's seat 67 and is connected to the axle brackets 11 by the mechanism shown in Figs. 2 and 4. Connected rigidly to the axle brackets 11, 11 are forward extending arms 79, 79, the forward ends of which are connected by ball and socket joints 80, 80 to the transverse steering bar 81. To one end of the transverse steering bar 81 is connected by means of a universal joint 82 the transverse steering shaft 83, the other end of which is pivoted at 84 as shown in Fig. 4 to the lower end of the arm 85 which is pivoted at 86 to a casing 87 for supporting the worm gearing 88 comprising the worm 89 meshing with the segmented worm gear 90. The worm 89 is secured to the steering rod or post 91, the lower end of which is mounted in suitable bearings in the casing 87 and the upper end of which is connected to the steering wheel 78. The worm gear casing 87 is rigidly secured to one of the side members of the supporting frame 7, as shown in Fig. 2.

When the grader is detached from a hauling vehicle, the front end thereof may be supported by the foot rest 92 as shown in full lines in Fig. 1. The upper end of the foot rest 92 may be pivoted at 93 to the bottom of the U-shaped cross-piece 19.

When the grader is in operation, the foot rest 92 may be swung to its dotted line position shown in Fig. 1 and held in such position by means of a hook 94 extending through a hole in the bottom plate 95 of the foot rest. The hook 94 may be connected to a clevis 96 pivotally connected at 97 to the bottom of the machine drawbar 23.

The operation of the trailer grader shown in Figs. 1, 2 and 3 is illustrated diagrammatically in Figs. 5 and 6.

When the front end of the frame 7 is pivotally hooked at 27 to the rear end of the frame 28 of the truck 29 at that corner thereof adjacent the edge 98 of the previously built or hard-surfaced roadway, while traveling in the direction of the arrow 99, material may be moved by means of the moldboard or scraper 43 laterally of the roadway on to the shoulder located between the lines 98 and 100. During operation of the grader to finish the shoulder at one side of the roadway, the traffic on the roadway moving in the direction of the arrow 101 need not be interfered with.

Inasmuch as the inclination of the moldboard or scraper 43 when operating as indicated in Fig. 5, tends to swerve the frame 7 toward the center of the roadway, the steering mechanism is so operated as to incline the wheels 12, 12 as indicated in Fig. 5. That is to say, the axles of the wheels 12, 12 are tilted in a clockwise direction relative to the longitudinal lines 98 and 100 to counteract the tendency of the operating moldboard to swerve the frame 7 in the opposite direction, the resultant movement of the moldboard being in a longitudinal direction along the line 98 while the moldboard is held in its adjusted position relative to the frame 7. The steering mechanism may also be operated to hold the grader in a trailing position directly back of the truck so that the dumping mechanism of the latter may be operated to gradually unload road building material therefrom while the scraper or moldboard moves such material off the roadway on to the shoulder. This may be followed by another operation such as that illustrated in Fig. 5, to spread and grade the material along the shoulder between the lines 98 and 100.

When it is desired to scrape material from an outer portion of the shoulder toward a depression at the edge of the roadway, the moldboard or scraper may be adjusted to the position shown in Fig. 6 when the tendency will be for the moldboard to swerve the rear end of the frame 7 away from the roadway on which the truck 29 travels. Consequently, the steering mechanism is so operated under these circumstances to tilt the rear wheels to travel toward the center line of the roadway. That is to say, the wheels are tilted in such a direction as to counteract the swerving tendency of the moldboard, the resultant movement being along lines parallel to the edge 98 of the roadway while the moldboard is held in adjusted position relative to the supporting frame 7.

Obviously those skilled in the art may make various changes in the details and arrangement of parts without departing from the spirit and scope of the invention as defined by the claims hereto appended, and we therefore wish not to be restricted to the precise construction herein disclosed.

Having thus described and shown an embodiment of our invention, what we desire to secure by Letters Patent of the United States is:

1. In a trailer grader for road shoulders, the combination with a vehicle frame comprising upwardly arched spaced-apart side members converging toward each other at their forward end portions, of a pair of steering wheels pivoted on upright axes at the rear end of said frame, an operator's station supported by said spaced-apart side members at the rear end of said frame, a drawbar flexibly connected to the front end portion of said frame and extending rearwardly under said upwardly arched portion of said frame, a circle pivoted to said drawbar on an upright axis, a moldboard carried by said circle, means for holding said circle and said drawbar in adjusted angular relation to said frame, a cross-piece between said side members, means connecting said drawbar to said cross-piece for holding the drawbar in adjusted laterally shifted position relative to said frame, mechanism adapted to readily and pivotally connect and readily disconnect the front end of said frame to one rear corner of a towing truck, and prevent up or down movement of the front end of said frame relatively to the truck when attached thereto, the said wheels and the said connection to the towing vehicle serving as the sole support for the frame with the moldboard in adjusted position relative thereto, and a pair of moldboard adjusting mechanisms one mounted on one side member and the other on the other side member and each comprising a hanger connected to the drawbar and each comprising a wheel operable from said operator's station.

2. In a trailer road grader, the combination with a vehicle frame comprising spaced-apart upwardly arched side members converging toward each other at their forward end portions, of steering wheels for the rear end of said frame, a readily detachable hook and eye connection between the front end of said frame and one rear corner of a truck to permit the vehicle to have freedom of lateral movement relative to the truck during travel of the latter, an operator's station at the rear end portion of said frame, a drawbar flexibly connected at its front end to the front end portion of said frame, a moldboard mounted on said drawbar for angular adjustment relative thereto on an upright axis, the front end of said frame being solely dependent for its support on such hook and eye connection during operation of the moldboard, means for holding the moldboard in adjusted angular position relative to said drawbar, means for holding said drawbar in laterally shifted position relative to said frame, separate means mounted on the respective side members and comprising hangers connected to opposite sides of said drawbar for adjusting the elevation of said moldboard and the inclination thereof transversely of the roadway, devices individual to said adjusting means actuatable from said operator's station to effect lifting and lowering of one end of the moldboard independently of the other end thereof, and steering mechanism connected to said rear wheels and operable from said station to effect swaying laterally of said frame on its pivotal connection to the towing truck in accordance with adjustment of the moldboard and so as to maintain the latter in shoulder operating position along one side of the roadway, while the truck remains on the main portion of the roadway.

3. In a road grader attachment, the combination with a vehicle frame comprising a pair of upwardly arched side members spaced-apart at their rear ends and converging toward each other at their forward end portions, of a pair of steering wheels pivoted to the rear end of said frame on upright axes, a towing truck unit, a readily attachable and detachable pivotal connection on a vertical axis between said vehicle frame and one rear corner of the frame of said truck unit, a drawbar flexibly connected to the front end portion of said frame for lateral and elevated adjustment of the rear end of the drawbar relative to said frame, a moldboard mounted on said drawbar for adjustment on an upright axis relative thereto, the front end of said frame being solely dependent for its support on said pivotal connection to the truck during operation of the moldboard, means for holding the moldboard in adjusted position relative to said drawbar, means for holding the drawbar and said moldboard in laterally adjusted position relative to said frame, separate mechanisms respectively mounted on the upwardly arched side members and comprising hangers connected to opposite sides of said drawbar for adjusting independently the elevations of the ends of the moldboard, a foot-rest adjustably connected to the forward portion of said frame and swingable to an upright position to support the front end of the frame on the ground when disconnected from the truck, means for supporting said foot-rest from said frame when the latter is connected to said truck, the front end of said frame being solely dependent for support during operation of the moldboard on said pivotal connection to the truck, separate wheels for operating the moldboard elevating mechanisms and located in positions spaced above said side members, an operator's station at the rear end of said frame adjacent to said wheels, steering mechanism connected to said steering wheels, and a wheel within reach of the operator at the operator's station for operating said steering mechanism.

4. In an attachment to a truck adapted to cooperate therewith to form a road shoulder grader, the combination with a vehicle frame comprising spaced side members upwardly arched intermediate their ends and converging toward each other at their forward end portions, an operator's station between the spaced-apart rear end portions thereof, a pair of steering wheels pivoted on upright axes to rear laterally projecting extensions at the rear end of said frame, means comprising a drawbar and a hook and eye structure for readily and detachably connecting the forward end of said frame to one rear corner of a truck, a drawbar flexibly connected to the forward end portion of said frame for up and down and lateral adjustment of the rear end of said drawbar under the upwardly arched portions of said side members, means mounted on said side members and comprising hangers connected to opposite sides of said drawbar for adjusting the latter, a moldboard mounted on said drawbar for adjustment relative thereto on an upright axis, the front end of said frame being solely dependent for its support on such hook and eye structure and the rear end of the truck during operation of the moldboard, means for holding the moldboard in adjusted position relative to said drawbar, means for holding the drawbar and moldboard in laterally shifted position relative to said frame, separate wheels spaced above said side members adjacent said operator's station and operable to effect lifting or lowering of said hangers independently of each other, steering mechanism connected to said steering wheels, and a steering wheel adjacent to the operator's station and connected to said steering mechanism, the construction and arrangement being such that when the frame is towed by said truck with the front end of said frame supported by the truck frame the operator at his station may effect steering of the rear end of the frame onto a shoulder at one side of the path of travel of the truck for operation of the moldboard on such shoulder and the operator during such operation may vary the depth and transverse inclination of the moldboard cut and vary the steering accordingly to maintain the moldboard path of travel along said shoulder.

WAYNE C. NEFF.
AMOS T. WORKMAN.
DALE LUPHER ANDERSON.
GEORGE HOLMAN.